April 6, 1954           K. O. KEEL           2,674,355
DRIVE AND CONTROL SYSTEM
Filed Feb. 16, 1951                         2 Sheets-Sheet 1
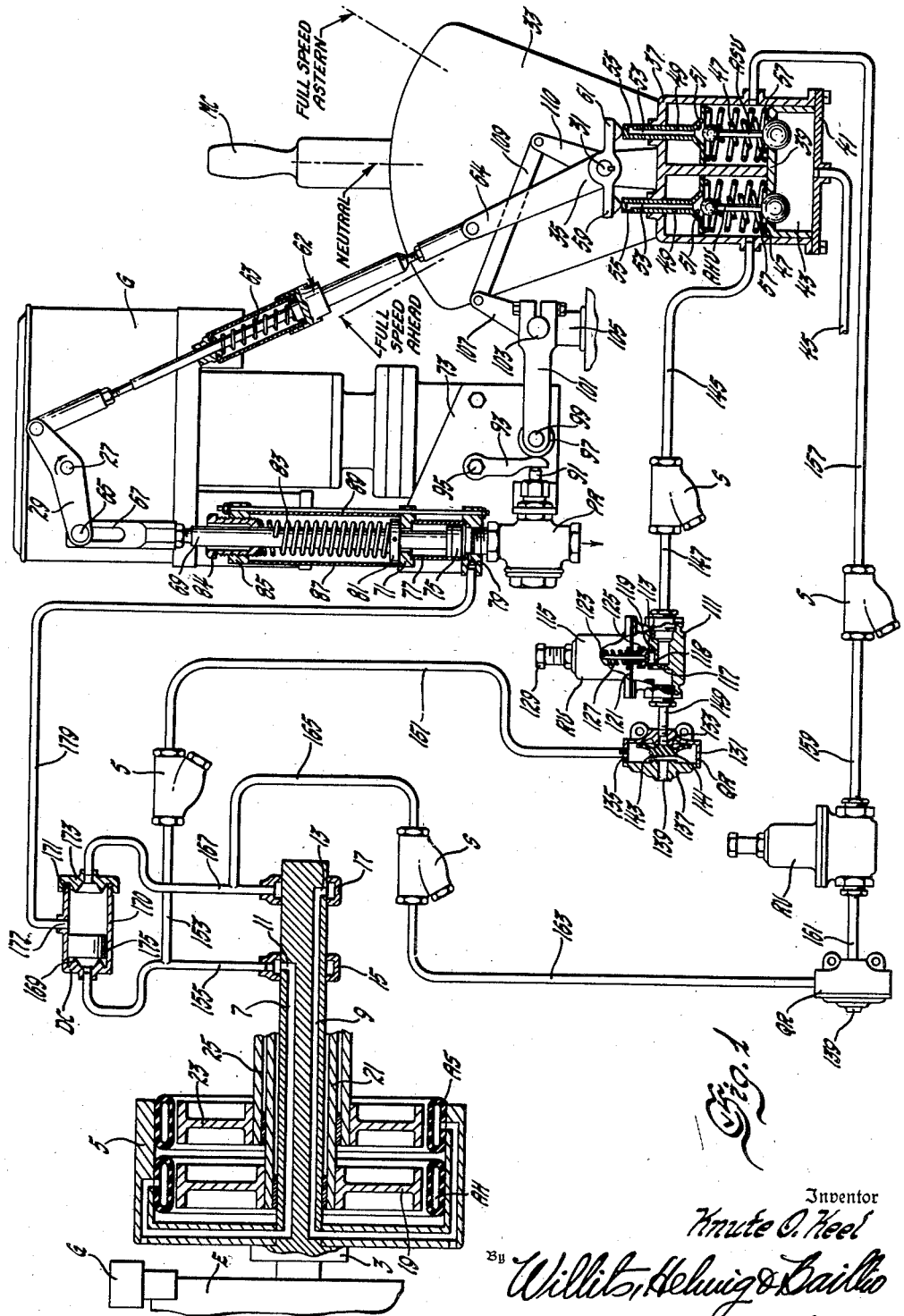
Inventor
Knute O. Keel
By Willits, Helwig & Bailko
Attorneys

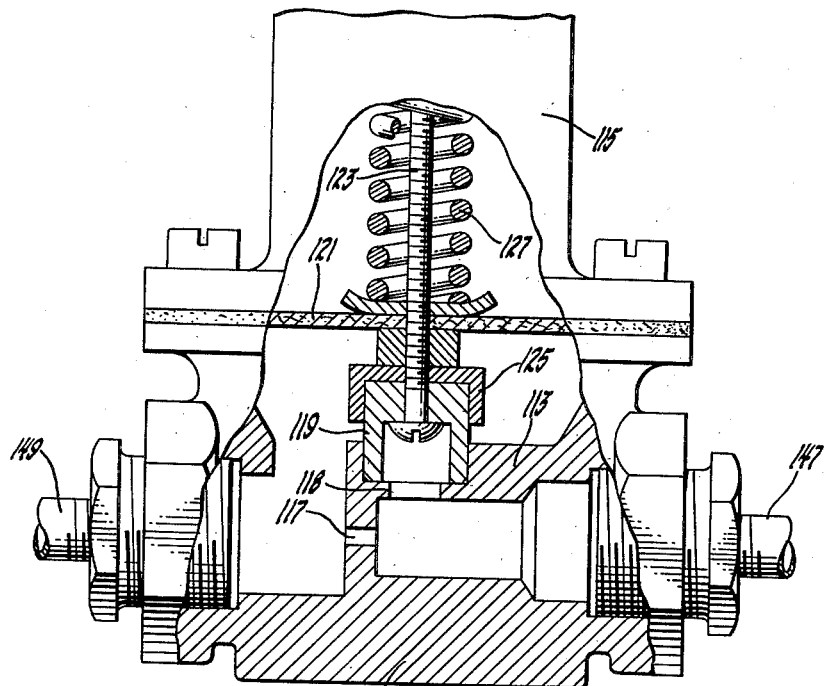
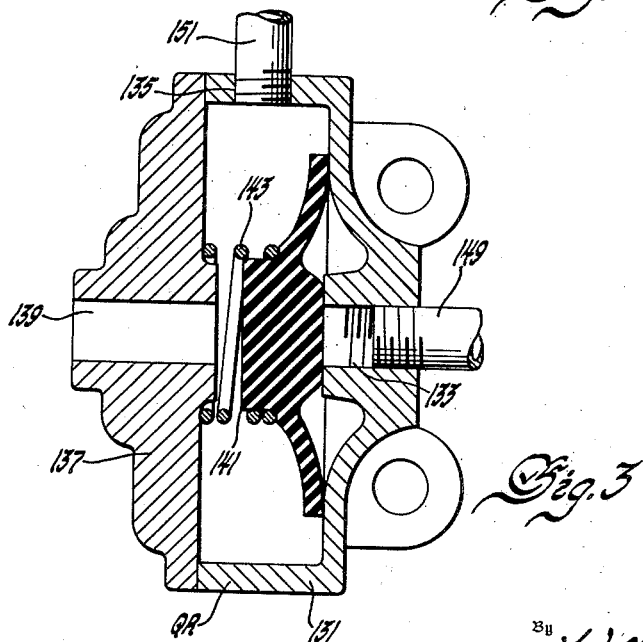

Patented Apr. 6, 1954

2,674,355

UNITED STATES PATENT OFFICE 2,674,355

DRIVE AND CONTROL SYSTEM

Knute O. Keel, Cleveland, Ohio, assignor to General Motors Corporation, Detroit, Mich., a corporation of Delaware Application February 16, 1951, Serial No. 211,268

8 Claims. (Cl. 192—.096)

The present invention relates to speed and reversing control systems and more particularly relates to maneuvering control systems for marine propulsion systems.

The principal object of the invention is to provide a simple marine drive and control system for a prime mover having speed setting means and ahead and astern driving clutches and control mechanism interconnecting the speed setting means and clutches to provide controlled engagement of either clutch and a controlled increase in speed setting of the prime mover from a low to a high value upon engagement of either clutch in response to manual movement of a maneuvering control lever between neutral and full speed ahead and astern controlling positions.

The combined means by which this object is accomplished, together with other novel features of the invention will become apparent by reference to the following detailed description and drawings of a marine control and propulsion system including a diesel engine.

Figure 1 of the drawings is a schematic view of the combined control and propulsion system.

Figures 2 and 3 are enlarged views of parts shown in Figure 1.

As best seen in the drawings a diesel engine E is shown directly connected by means of an engine driven shaft 3 to the driving drum 5 of inflatable, annular ahead and astern driving clutches AH and AS carried on the internal surface of the driving drum 5. The driven shaft 3 and clutch driving drum 5 are provided with separate communicating passages 7 and 9 extending between each clutch and separate pressure supply ports 11 and 13 in the driven shaft 3. Separate air seal members 15 and 17 are rotatably mounted in sealing relation on the driven shaft, the interior of each seal being shown in register with each of the separate supply ports 11 and 13 in the shaft 3.

A driven drum 19, shown located within the ahead driving clutch AH, is secured to a hollow ahead driving shaft 21 rotatably supported on the shaft 3 and is connected by gears, not shown, in conventional manner to a propeller shaft, not shown, for causing ahead rotation of the propeller shaft when the ahead clutch is inflated and engages the driven clutch drum 19.

A driven drum 23 for the astern clutch AS, shown located within this clutch, is secured to a hollow astern driving shaft 25 rotatably supported on the hollow shaft 21. The hollow shaft 25 is connected by means of reversing gearing, not shown, to the propeller shaft, in conventional manner in order to cause astern rotation thereof when the astern clutch is inflated and engages the driven drum 23 thereof.

The engine E is provided with an engine driven centrifugal governor G of conventional type, having a speed setting shaft 27 rotatable therein and a two arm speed setting lever 29 secured thereto. The speed setting lever 29 and shaft 27 are rotated clockwise, in the direction of the arrow, to increase governor speed setting and thereby increase the fuel supplied the engine and the engine speed and power output in a well known manner. The speed setting shaft 27 and lever 29 are shown in the engine idle speed setting position.

A single manually operable maneuvering lever MC is secured to a control shaft 31 rotatably mounted in a control stand 33 for movement between a neutral position and full speed ahead and astern controlling positions either side of the neutral position. A four arm lever 35 is secured to the control shaft 31 for operating the governor speed setting lever 29. A conventional pressure relief valve PR is shown on the governor G, and ahead and astern pressure application and relief valves AHV and ASV of the dumbbell type are shown in separate cavities in a control valve housing 37 secured to the control stand 33.

The ahead and astern control valves AHV and ASV are identical, and each is shown located in a separate cavity in the valve housing 37 having a removable partition 39 seated therein at the ends of the cavities and spaced from a cover plate 41 to form a common pressure supply chamber 43 therebetween. An air pressure supply pipe 45 is shown connected to an opening in the cover plate 41 and communicating with the pressure supply chamber 43.

The lower ball of each of the dumbbell valves AHV and ASV is retained seated in a separate seat opening extending through the partition 39 from the pressure chamber 43 to each of the separate valve cavities by means of a spring 47 placed between the partition 39 and the upper ball of each of the valves AHV and ASV. Separate identical valve stems 49 are slidable in separate openings in the upper end of each valve cavity. The inner larger diameter end shown provided on each valve stem 49 is slidable in each of the valve cavities and is provided with a pressure relief seat opening 51 from which an axial passage 53 in each valve stem extends to a relief port 55 adjacent the upper end face of the stem, shown projecting out of the valve housing 37. A spring 57 is placed between the partition 39 and the inner end of each valve stem to normally position the stem relief seat openings 51 upwardly and out of seating relation with the upper balls of the ahead and astern valves AHV and ASV. The upper end faces of the valve stem 49 are shown located equi-distant on opposite sides of the control shaft 31 and the outer end of each stem is accordingly held in engagement with a depending cam surface provided on the outer end of separate, oppositely disposed arms 59 and 61 of the four arm lever 35 by the springs 57 and the maneuvering control lever MC is thus resiliently urged by the springs 57 to the neutral position, as shown. A two part, telescopic, resiliently extensible and non-compressible link, generally indicated by the reference character 62, is provided with a compression spring 63 between the parts of the link. This link 62 is shown pivotally connected between another arm 64 of the four arm lever 35 and one arm of the speed setting lever 29. It will be noticed that the two telescopic parts of the extensible link 62 and arm 64 of the lever 35 are in radial alignment with the axis of the control shaft 31 and are therefore in dead center relationship so that upon movement of the maneuvering control lever MC in either direction from the neutral position a downward force will be applied on the extensible link 62 tending to rotate the speed setting lever and shaft 29 and 27 clockwise to increase the speed setting of the engine governor G. The other arm of the speed setting lever 29 is provided with a pivot pin 65 shown slidable in a slot 67 in the upper end of a piston rod 69 which is shown extending through an opening in an upper cylinder head 71 carried on a bracket 73 secured to the engine governor G. The lower end of the piston rod 69 is provided with a piston 75 slidable in an air cylinder 77 located between the upper cylinder head 71 and a lower cylinder head 79. An abutment 81 on the piston rod 69 is retained in engagement with the upper face of the cylinder head 71 by means of a stiff compression spring 83 placed on the piston rod with the lower end of this spring engaging the abutment 81 and the upper end engaging a hollow spring seat 84. The spring seat 84 is adjustably threaded in an annular upper flange 85 of a tube 87 surrounding the spring 83. Hold down bolts 89 extend through openings in the cylinder heads 71 and 79 and upper flange 85 of the tube 87 and nuts on these bolts retain the cylinder heads on the cylinder 77 and also retain the tube 87 on the upper cylinder head 71. The spring 83 is stiffer than the spring 63 in the extensible link 62 and biases the abutment 81 of the piston rod 69 onto the upper cylinder head 71 and the upper end of the slot 67 of the piston rod is thereby held in contact with the pin 65 on the speed setting lever 29 to urge it to the idle speed setting position and thereby urge the maneuvering lever MC in the neutral position by means of the extensible link 62.

The pressure relief valve PR, previously mentioned, is screwed in a central opening in the lower cylinder head 79 and is provided with a valve stem 91 movable inwardly to open this valve and quickly relieve the pressure below the piston 75 from a lower outlet opening provided in the valve PR. The relief valve stem is urged outwardly by a spring, not shown, to cause closure of the relief valve PR. A lever 93 is pivoted at its upper end by means of a pin 95 on the bracket 73 adjacent the relief valve PR. A flat is shown provided on one side of the lever 93 and in engagement with the outer end of the stem 91 of the pressure relief valve PR and a convex portion is shown on the other side of the lever 93. A roller 97, shown in contact with the convex portion of the lever 93, is rotatably supported by means of a pin 99 in the outer end of a lever 101 secured at the other end to a shaft 103 rotatable in a stationary bearing 105. Another lever 107 is also secured to the shaft 103 and is connected by a link 109 to the remaining arm 110 of the four arm lever 35 on the control shaft 31. When the maneuvering lever MC is in the neutral position the roller 97 on the lever 101 engages the convex portion of the lever 93 and this lever holds the stem 91 of the pressure relief valve PR in the full open position. As explained, a spring, not shown, urges the pressure relief valve stem outwardly to cause closure of this valve. The convex portion on the lever 93 is engaged by the roller 97 on the lever 101 when the maneuvering lever MC approaches the neutral position when moved from either the full speed ahead or full speed astern position, to start opening the relief valve PR. This causes the start of pressure relief from the space in the cylinder 77 below the piston 75 therein and the prompt return of the piston rod 69 to the position, shown by the spring 83 to hold the speed setting lever in the idle speed setting position and to bias the maneuvering lever MC to the neutral position, as previously explained. It will be evident that when sufficient air pressure is applied to the lower face of the piston 75 to overcome the stiff return spring 83 acting thereon the pin 65 on the speed setting lever 29 may be freely moved upwardly in the slot 67 of the piston rod 69 and the speed setting lever 29 may then be moved toward the full speed setting position by movement of the maneuvering lever MC acting through the extensible link 62 without extension thereof and therefore not causing the spring 63 therein to be compressed.

Air strainers S, a pressure flow regulating valve RV and a quick acting pressure relief valve QR are provided in separate pressure supply connections to control the rate of pressure flow to and inflation of each of the clutches AH and AV and relief of pressure therefrom to cause smooth controlled engagement and rapid disengagement thereof. The strainers S and each of the valves RV and QR are of conventional type and operate in a well known manner. A double check valve DC, also of conventional type, is connected to the clutches and also connected to the air cylinder 77 so that air pressure is supplied to this cylinder when either clutch is inflated to cause engagement thereof and also to prevent inflation and engagement of one clutch until the other clutch is deflated and disengaged.

Each pressure flow regulating valve RV includes a housing 111 having a partition 113 therein, to form pressure inlet and outlet cavities in the housing, and a bonnet 115 secured to the housing. A pressure flow restricting orifice 117 and a larger inlet port 118 having a surrounding valve seat 119 are shown provided in the housing partition 113. A diaphragm 121 is secured between the valve housing 111 and the valve bonnet 115 and a valve stem 123 is secured to the diaphragm and has a valve head 125 thereon which is retained seated on the valve seat 119 by a spring 127 placed between the diaphragm and a regulating screw 129 threaded in an opening of the bonnet 115.

Each quick acting release valve QR, as mentioned, is of conventional type. Each valve QR includes a housing 131 having an inlet port 133 in one end and an outlet port 135 in the side. An end cap 137 is secured to the housing 131 and is provided with a central exhaust port 139. A resilient diaphragm 141 having a central thicker portion is held seated on the inlet port 133 and the thinner outer portion of the diaphragm is held seated on the housing between the inlet and outlet ports 133 and 135 by a spring 143 placed between the diaphragm and the housing cap 137.

Two of the strainers S, a regulating valve RV and a quick release valve QR are connected in series by means of pipe connections 145, 147, 149, 151, 153 and 155 between the cavity in the control valve housing 37 for the ahead clutch application and relief valve AHV and the interior of the seal 15 for the ahead clutch AH. It will be noted that one of these strainers S is connected to the inlet pipe connection 147 for the regulating valve RV, the outlet pipe 149 of which is connected to the inlet port 133 of the quick release valve QR and that the other strainer S is connected to the outlet port 135 of the valve QR by the pipe connection 151.

Two other strainers S, a regulating valve RV and a quick-release valve QR are connected in identical manner between the other cavity in the control valve housing 37 for the astern application and relief valve ASV and the interior of the seal 17 for the astern clutch AS by means of pipe connections 157, 159, 161, 163, 165 and 167.

The pipe connection 155 to the interior of the seal 15 for the ahead clutch AH is also connected to a central inlet opening in the left end seat 169 of the cylindrical housing 170 of the double check valve DC. The pipe connection 167 to the interior of the seal 17 for the astern clutch AS is also connected to a central opening in the seat 171 of the cap 173 secured to the right end of the check valve housing 170. A piston 175 is slidable in the housing 170 past a central outlet port 177 therein, and into seating relation with either the housing seat 169 or the seat 171 on the housing cap 173. The outlet port 177 of the double check valve DC is shown connected by a pipe connection 179 to a passage in the lower head 79 of the air cylinder 77 extending to the space in the cylinder between the piston 75 and cylinder relief valve PR.

With the above described elements of the drive and control system in the position shown, initial movement of the maneuvering control lever MC from the neutral position to either the full speed ahead or astern position causes initial movement of the control shaft 31, four arm lever 35, link 62, link 109 and levers 107, 101 and 93 to provide the following sequence of events to take place: The arm 64 of the four arm lever is moved out of dead center relation with the extensible link 62 causing compression of the spring 63 therein and extension of the link 62, as the upper part thereof is connected to one arm of the speed setting lever 29 which, as previously explained, is held in the idle speed setting position by the stiffer spring 83 acting on the piston rod 69 and the upper slotted end of which engages the pin 65 on the opposite arm of the speed setting lever.

At the same time the arm 110 of the four arm lever moves the link 109, connected with lever 107 on the shaft 103 and rocks the other lever 101 on this shaft causing the roller 97 on the lever 101 to move off the convex portion of the lever 93. This causes closure of the pressure relief valve PR for the air cylinder 77 in the previously explained manner.

At the same time one of the oppositely disposed arms 59 or 61 of the four arm lever 35 contacts and moves one of the valve stems 49 downwardly to cause either stem relief seat 51 to seat on the upper ball and move the lower ball of either the astern or ahead dumbbell valves AHV or ASV off its seat in the partition 39 in the control valve housing 37. This causes air pressure from the pressure supply pipe 45 and pressure chamber 43 in the control valve housing to be supplied through either of the unseated ahead or astern valves AHV or ASV to either the ahead or astern driving clutch AH or AS and through the double check valve DC to the air cylinder 77. If the ahead valve AHV is unseated, air pressure will flow through the pipe connections 145, 147, 149, 151, 153, 155 and 177, two of the air strainers S, a pressure regulating valve PR and a quick release valve QR to the ahead clutch seal 15 and to the left end of the double check valve DC. This flow of air is restricted by the restricting orifice 117 of the regulating valve RV and moves the central portion of the diaphragm 141 of the quick release valve QR into seating relation with the exhaust port 139 and moves the outer portion of the diaphragm out of seating relation on the housing between the inlet and outlet ports 133 and 135 therein and cause free flow of air therebetween. This restricted flow of air passes from the ahead clutch seal 15 through the communicating passages 7 in the engine driven shaft 3 and clutch driving member 5 to the ahead driving clutch to start inflation thereof. Also this restricted flow of air acts on the left face of the piston 175 in the double check valve DC and causes the piston to move to the right past the outlet port 177 and seat on the seat 171 in the cap 173 of the check valve housing 170. Opening of the double check valve outlet port 177 permits restricted air flow through the pipe connection 179 to the piston 75 in the air cylinder 77. Seating of the double check valve piston 175 on seat 171 prevents inflation of the astern clutch AS through the pipe connection 167 and thereby prevents engagement of the astern clutch. When the pressure rises in the ahead clutch AH, air cylinder 77 and space below the diaphragm 121 in the regulating valve RV to a value sufficient to overcome the force of the spring 127 acting on this valve diaphragm 121 it will move up and move the valve head 125 off the valve seat 119 and permit an increased rate of pressure flow through the port 118 to the ahead clutch and air cylinder. It will be evident that the greater the air pressure acting on this diaphragm the farther this valve head will be moved off this seat and the greater the pressure flow through the port 118. This rate of flow may be regulated by the adjusting screw 129 acting on the diaphragm spring 127 in order to provide the proper rate of inflation and thereby provide smooth driving engagement of the ahead clutch AH with its driven drum 19. During engagement or upon full non-slipping driving engagement of the ahead clutch AH, air pressure in the air cylinder 77 acting on the piston 75 therein overcomes the pressure of the stiff spring 83 acting on the piston rod 69 and causes the start of upward movement thereof. This permits controlled movement of the speed setting lever 29 clockwise to the full speed setting position by expansion of the previously compressed spring 63 in the extensible link 62 and contraction thereof as the lower part of this link was previously moved to and held in the full speed position by the maneuvering control lever MC. Expansion of the spring 63 in the two part link 62 moves the upper part downwardly and rocks the speed setting lever 29 to the full speed setting at a rate depending upon the rate of upward movement of the piston rod 69, as the pin 65 on the speed setting lever is engaged by the upper end of the slot 67 in the piston rod 69. The start of upward movement and the rate of this movement of the piston 75 and piston rod 67 may be varied by adjustment of the adjustable seat 84 for the piston rod spring 83 and also by the adjustment of the screw 129 of the pressure regulating valve RV. Both of these adjusting means provides controlled smooth clutch engagement and a controlled increase in the governor speed setting and a corresponding increase in engine speed and output during engagement of the clutch or upon full engagement thereof.

As the astern clutch AS, as described, is connected in similar manner to the air cylinder and pressure supply pipe 45 and chamber 43 through the opposite end of the double check valve DC, the similar controlled clutch engagement and quick disengagement and speed setting adjustment are provided by another pressure regulating valve RV and another quick release valve QR.

It will be evident that manual movement of the maneuvering control lever MC from either the full speed ahead or astern positions back to the neutral position, initially causes movement of the speed setting lever 29 back to the idle speed setting position through the link 62 which is non-contractible and because the pin 65 on the speed setting lever is freely movable from the upper to the lower end of the slot 67 in piston rod 69 when in the upper position. Shortly before the maneuvering control lever MC reaches the neutral position the cylinder pressure relief valve PR will be opened and the relief seat portion 51 of either of the valve stems 49 will be unseated by a spring 57 from the upper ball and the lower ball of either the ahead or astern valves AHV or ASV will be seated by a spring 47. Full opening of the cylinder relief valve PR, when the maneuvering control lever reaches the neutral position causes prompt relief of pressure from the cylinder 77 and the stiff spring 83 acts to return the piston rod 69 promptly to the position shown, to again hold the speed setting lever 29 in the engine idle speed setting position. Unseating of a valve stem relief seat 51 from an upper ball of either the ahead or astern valves AHV or ASV releases the pressure from a regulating valve RV and quick release valve QR in the pressure connections to either clutch through the relief passage 53 and port 55 in the stem and the seating of the lower valve ball cuts off air pressure to this pressure connection. When the pressure is relieved through the valve stem relief passage 53 and port 55 from either clutch pressure connection, the valve head 125 of the pressure regulating valve RV is seated by the spring 127 acting on the diaphragm 121 and the diaphragm 141 of the quick release valve QR moves off the exhaust port 139 and seats on the intake port 133 causing quick release of pressure from the clutch and one side of the piston 175 through the outlet and exhaust ports of the quick release valve QR. It will be noted that the opening of the cylinder relief valve PR also relieves the pressure on the same side of the double check valve piston 175 and from the inflated clutch and the clutch inflation pressure on this piston 175 holds it seated until the clutch is deflated and disengaged before the other clutch can be inflated through this double check valve. The cylinder relief valve PR is mechanically moved to the open position by the maneuvering control lever MC when this lever is eight degrees either side of the neutral position to insure that the governor speed setting lever 29 is forced by the spring 83 to the engine idle speed setting during deflation of one clutch and inflation of the other clutch, irrespective of the speed of movement of the maneuvering control lever MC through the neutral position between the full speed positions. This insures controlled engagement of either clutch and controlled increase in the engine speed during engagement, or upon full engagement of either clutch.

I claim:

1. In a drive and control system, an engine having speed setting means, resilient means normally biasing the speed setting means to the low speed setting, manual control means movable between low and high speed controlling positions, fluid pressure actuated means for disengaging the speed setting means from the biasing means, a resilient link mechanically interconnecting the speed setting means and the manual control means for urging the manual control means to the low speed controlling position when said biasing means is engaging the speed setting means and urging the speed setting means toward a high speed setting when the biasing means is disengaged and the manual control means is at an increased speed controlling position, a fluid pressure engaged driving clutch driven by the engine, a fluid pressure supply pipe, a pressure application and relief control means connected between the pressure supply pipe and the pressure engaged clutch and pressure actuated means and controlled by the manual control means to control engagement of the clutch and actuation of the pressure actuated means when moved toward the high speed controlling position and to cause disengagement of the clutch and engagement of the biasing means when moved to the low speed controlling position.

2. In a drive and control system, an engine having speed setting means, resilient means normally biasing the speed setting means to the low speed setting, pressure actuated means for disengaging the biasing means, manual control means movable between low and high speed controlling positions, a resilient link mechanically interconnecting the speed setting means and the manual control means for urging the manual control means to the low speed controlling position when said biasing means is engaging the speed setting means and urging the speed setting means toward a high speed setting when the biasing means is disengaged and the manual control means is at an increased speed controlling position, a fluid pressure engaged driving clutch driven by the engine, a fluid pressure seal for the clutch, a source of air pressure, pressure application and relief means connected between the pressure source and the clutch seal and pressure actuated means and controlled by the manual means for controlling engagement of the clutch and actuation of the pressure actuated means upon movement of the manual means against the force of the biasing means and resilient link.

3. In a marine drive and control system, an engine having speed setting means, resilient means normally biasing the speed setting means to a low speed setting, fluid pressure actuated means for disengaging the biasing means, a maneuvering control lever movable from a neutral, low speed controlling position to full speed ahead and astern controlling positions, a resilient connection interconnecting the control lever and speed setting lever to position said lever in the neutral slow speed position when said biasing means is engaging the speed setting means and urging the speed setting means toward a high speed setting when the biasing means is disengaged and the lever is at an increased ahead or astern speed controlling position, fluid pressure engaged ahead and astern driving clutches driven by the engine, a source of air pressure, a fluid connection including pressure application and relief means connected between the pressure source and each clutch and controlled by the control lever to relieve the pressure in and cause disengagement of said clutches when the lever is in the neutral position, pressure connections including a double check valve interconnecting the clutches and pressure actuated means for connection of the pressure actuated means to either clutch and to check application of pressure to the other clutch upon movement of the control lever to either the full speed positions.

4. In a marine drive and control system, an engine having speed setting means, resilient means normally biasing the speed setting means to the low speed setting, fluid pressure actuated means for disengaging the biasing means and including a normally closed pressure relief valve, fluid pressure engaged ahead and astern clutches driven by the engine, separate fluid pressure seals, each seal communicating with one clutch, a double check valve connected between the seals and pressure actuated means and operable upon pressure application to either clutch to connect the pressure actuated means therewith and to check pressure application to the other clutch, a maneuvering control lever movable in opposite directions from a neutral, low speed controlling positions to full speed ahead and astern controlling positions, resilient means interconnecting the lever to the speed setting means for normally positioning the lever in the neutral position when said biasing means is engaging the speed setting means and urging the speed setting means toward a high speed setting when the biasing means is disengaged and the lever is at an increased ahead or astern speed controlling position, said relief valve being operatively connected to the lever and moved to the open position when the lever is in the neutral position and in positions either side of neutral a slight distance, a source of air pressure, separate fluid connections each including pressure application and relief valve means connected between the pressure source and each clutch seal, certain of said pressure application and relief valve means being directly connected to the maneuvering control lever and positioned in the pressure relief controlling position upon movement of the lever to the neutral position and to positions either side thereof a slight amount.

5. In a marine drive and control system, an engine having a governor provided with engine speed setting means, resilient means normally biasing the speed setting means to a low speed setting, fluid pressure actuated means for disengaging the biasing means, a maneuvering control lever mechanically linked to the speed setting means and movable between a neutral and ahead and astern controlling positions, a normally closed pressure relief valve connected to the pressure actuated means, means actuated by the lever for opening said relief valve during movement of the lever toward the neutral position, fluid pressure engaged ahead and astern driving clutches driven by the engine, a fluid pressure seal in fluid communication with each clutch, a double check valve connected between the clutch seals and pressure actuated means and operable upon application of pressure to either seal to apply a corresponding pressure to the pressure actuated means and to check application of pressure to the other clutch seal, a source of air pressure, a separate fluid connection interconnecting each clutch seal with the pressure source and including a plurality of pressure application and relief controlling means, certain of said pressure application and relief controlling means being associated with and movable by the maneuvering control lever to the pressure relief controlling position when the lever is in substantially the neutral position, the other of the pressure application and relief controlling means being pressure actuated to the application and relief positions.

6. In a marine drive and control system, an internal combustion engine having a governor provided with engine speed setting means, resilient means normally biasing the speed setting means to a low speed setting, fluid pressure actuated means for disengaging the biasing means, fluid pressure engaged ahead and astern driving clutches driven by the engine, a fluid pressure seal in fluid communication with each clutch, fluid connections including a double check valve interconnecting the clutch seals with the pressure actuated means for pressure application to the pressure actuated means from either seal and for checking pressure application to the other seal, a source of air pressure, separate fluid connections connected between each clutch seal and air pressure source, each fluid connection including a pressure application and relief valve and a pressure actuated valve for increasing the air pressure flow from the source upon an increase in pressure in a pressure connection, a manually operable maneuvering control lever directly connected to the pressure application and relief valves and manually movable in opposite directions to either full speed ahead or full speed astern controlling positions from a neutral position for moving either pressure application and relief valve from the pressure relief position to the pressure application position to control the rate of pressure engagement of either clutch and rate of movement of the pressure actuated means in disengaging the biasing means for the speed setting means, and a link mechanically interconnecting the maneuvering lever to the speed setting means, said link being resiliently yieldable during movement of the lever in either direction from the neutral position and being rigid during movement of the lever toward the neutral position.

7. In a marine drive and control system, an engine having a governor provided with speed setting means, resilient means normally biasing the speed setting means to a low speed setting, fluid pressure actuated means for disengaging the biasing means, fluid pressure engaged ahead and astern driving clutches driven by the engine, each driven clutch having a stationary fluid seal in fluid communication therewith, fluid connections including a double check valve for pressure application to the pressure actuated means from either clutch seal and for checking application of pressure to the other clutch seal, a source of air pressure, separate fluid connections interconnecting the source of air pressure to each clutch seal, each of said separate fluid connections including a pressure application and relief valve and a relief valve acting in response to a decrease in pressure in the fluid connection to quickly relieve the pressure therein, a manually operable maneuvering control lever directly connected to both pressure application and relief valves for moving either of said valves to the pressure application position when the maneuvering control lever is moved slightly from a neutral position in either direction toward full speed ahead or astern controlling positions, and a resilient link connected between the speed setting means and the maneuvering lever for urging the maneuvering control lever to the neutral low speed position when said biasing means is engaging the speed setting means and urging the speed setting means toward a high speed setting when the biasing means is disengaged and the lever is at an increased ahead or astern speed controlling position.

8. In a marine drive and control system, an internal combustion engine having a governor provided with speed setting means, resilient means normally biasing the speed setting means to a low speed setting, fluid pressure actuated means for disengaging the biasing means, a normally closed pressure relief valve connected directly to the pressure actuated means, fluid pressure engaged ahead and astern driving clutches driven by the engine, a fluid pressure seal in a fluid communication with each clutch, fluid connections including a double check valve interconnecting each clutch seal with the pressure actuated means to apply fluid pressure from either seal to the pressure actuated means and to check pressure application to the other seal, a source of air pressure, separate fluid connections connected between the source of pressure and each clutch seal, each of said separate fluid connections including a pressure application and relief valve, a pressure responsive pressure flow control valve and a pressure responsive relief valve, each pressure responsive pressure flow control valve acting to increase the flow of pressure to a clutch seal upon an increase in pressure therein, each of said pressure responsive relief valves acting to quickly release the pressure in a clutch seal upon a slight reduction in pressure by action of an application and relief valve, a manually operable maneuvering control lever directly connected to the pressure relief valve and both pressure application and relief valves and movable in either direction from a neutral slow speed controlling position, in which the pressure relief valve is opened and both pressure application and relief valves are maintained in the pressure relief positions, to full speed ahead or astern controlling positions to close the pressure relief valve and move either application and relief valve to the pressure application position to cause pressure application to either of said clutches and to the pressure actuated means through a pressure responsive pressure flow control valve and the double check valve and thereby control the rate of clutch engagement and rate of movement of the pressure actuated means in disengaging the biasing means, and a spring link connecting the speed setting means to the maneuvering lever for urging the lever to the neutral slow speed position when said biasing means is engaging the speed setting means and urging the speed setting means toward a high speed setting when the biasing means is disengaged and the lever is at an increased ahead or astern speed controlling position, said spring link deflecting upon manual movement of the maneuvering lever against the action of the biasing means.

References Cited in the file of this patent
UNITED STATES PATENTS

| Number | Name | Date |
| --- | --- | --- |
| 2,386,391 | Fike | Oct. 9, 1945 |
| 2,396,231 | Brill | Mar. 12, 1947 |
| 2,426,064 | Stevens | Aug. 19, 1947 |
| 2,433,916 | May | Jan. 6, 1948 |